US009523392B2

(12) United States Patent
Honda et al.

(10) Patent No.: US 9,523,392 B2
(45) Date of Patent: Dec. 20, 2016

(54) SHAFT-TO-UNIVERSAL JOINT COUPLING STRUCTURE

(71) Applicant: JTEKT CORPORATION, Osaka-shi, Osaka (JP)

(72) Inventors: Osamu Honda, Fujiidera (JP); Masaru Yamawaki, Toyonaka (JP); Mitsuharu Ozaki, Kashiba (JP); Naoji Kawasoko, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 192 days.

(21) Appl. No.: 14/558,018

(22) Filed: Dec. 2, 2014

(65) Prior Publication Data
US 2015/0167747 A1    Jun. 18, 2015

(30) Foreign Application Priority Data

Dec. 12, 2013   (JP) .................. 2013-257226

(51) Int. Cl.
*B62D 1/16*     (2006.01)
*F16D 3/20*     (2006.01)
*F16D 3/38*     (2006.01)

(52) U.S. Cl.
CPC .............. *F16D 3/387* (2013.01); *B62D 1/16* (2013.01); *F16D 3/20* (2013.01); *Y10T 403/7079* (2015.01); *Y10T 403/7188* (2015.01)

(58) Field of Classification Search
CPC ............. B62D 1/16; B62D 1/20; F16C 11/02; F16D 1/06; F16D 1/068; F16D 3/20; F16D 3/387; Y10T 403/10; Y10T 403/7018; Y10T 403/7079; Y10T 403/7084; Y10T 403/7086; Y10T 403/7088; Y10T 403/7182; Y10T 403/7194

USPC ... 403/1, 355, 379.3, 379.4, 379.5, 398, 399
See application file for complete search history.

(56) References Cited

U.S. PATENT DOCUMENTS

| | | | | |
|---|---|---|---|---|
| 2,596,821 | A | * 5/1952 | Parkins | ................... B23B 31/08 144/230 |
| 2,758,289 | A | * 8/1956 | Schaber | ................... B62D 1/16 174/138 D |
| 3,214,942 | A | * 11/1965 | Hill | ........................... F16D 3/04 403/152 |
| 3,511,388 | A | * 5/1970 | Markwardt | ............. B66C 23/70 212/177 |

(Continued)

FOREIGN PATENT DOCUMENTS

| CN | 102384174 A | 3/2012 |
|---|---|---|
| EP | 0694704 A1 | 1/1996 |

(Continued)

OTHER PUBLICATIONS

Aug. 24, 2016 Search Report issued in European Patent Application No. 14 19 6201.9.

*Primary Examiner* — Josh Skroupa
(74) *Attorney, Agent, or Firm* — Oliff PLC

(57) ABSTRACT

A shaft-to-universal joint coupling structure includes: a column shaft; a universal joint including a shaft yoke; a sleeve to which the column shaft and the universal joint are fitted; and a coupling pin inserted into a through-hole of the shaft yoke and an insertion hole of the sleeve. The coupling pin has a small-diameter portion inserted into the insertion hole, and a step portion positioned inward of an inner peripheral face of the sleeve in the radial direction of the sleeve.

5 Claims, 4 Drawing Sheets

(56) References Cited

U.S. PATENT DOCUMENTS

| | | | | |
|---|---|---|---|---|
| 5,562,360 A | * | 10/1996 | Huang | F16D 3/32 |
| | | | | 403/305 |
| 5,582,489 A | | 12/1996 | Marzio et al. | |
| 5,765,301 A | * | 6/1998 | Clendenning | E02F 9/2841 |
| | | | | 37/455 |
| 7,429,216 B2 | * | 9/2008 | Sekine | B62D 1/20 |
| | | | | 464/145 |
| 8,292,775 B2 | * | 10/2012 | Nakajima | F16H 48/08 |
| | | | | 475/230 |
| 8,342,972 B2 | * | 1/2013 | Yamazaki | F16D 1/0864 |
| | | | | 464/145 |

FOREIGN PATENT DOCUMENTS

| | | |
|---|---|---|
| EP | 1693586 A1 | 8/2006 |
| EP | 2562438 A2 | 2/2013 |
| JP | U-5-89963 | 12/1993 |

* cited by examiner

Prior Art

SHAFT-TO-UNIVERSAL JOINT COUPLING STRUCTURE

INCORPORATION BY REFERENCE

The disclosure of Japanese Patent Application No. 2013-257226 filed on Dec. 12, 2013 including the specification, drawings and abstract, is incorporated herein by reference in its entirety.

BACKGROUND OF THE INVENTION

1. Field of the Invention

The invention relates to a shaft-to-universal joint coupling structure.

2. Description of the Related Art

Examples of conventional shaft-to-universal joint coupling structures include a coupling structure for coupling a column shaft of a steering shaft to a universal joint. Japanese Utility Model Application Publication No. 5-89963 describes an example of a conventional shaft-to-universal joint coupling structure.

FIG. 8 illustrates a coupling structure for coupling a universal joint 200 to a column shaft 220. The column shaft 220 is inserted into a yoke 210 of the universal joint 200. The yoke 210 and the column shaft 220 are coupled to each other with a coupling pin 230. The coupling pin 230 is press-fitted in a through-hole 221 of the column shaft 220. Opposite end portions of the coupling pin 230 are respectively inserted into insertion holes 211 of the yoke 210.

The operation of a steering member (not illustrated) repeatedly applies torsional torque to the coupling pin 230, thereby loosening the coupling pin 230 that has been press-fitted in the through-hole 221. This raises a possibility that the coupling pin 230 will come out of the through-hole 221.

However, the coupling structure for coupling the universal joint 200 to the column shaft 220 includes a cap 240 fixed to the outer peripheral face of the yoke 210. The cap 240 covers the insertion holes 211 of the yoke 210 and the coupling pin 230. Thus, even if the coupling pin 230 that has been press-fitted in the through-hole 221 loosens, the cap 240 restricts movement of the coupling pin 230, thereby preventing the coupling pin 230 from coming out of the through-hole 221.

Because the conventional coupling structure for coupling the universal joint 200 to the column shaft 220 includes the cap 240, the number of components and the number of man-hours required for assembly increase. Such increases in the number of components and the number of man-hours required for assembly may occur not only in a coupling structure for coupling a column shaft to a universal joint but also in a coupling structure for coupling an intermediate shaft of a steering shaft to a universal joint, a coupling structure for coupling a pinion shaft of a steering shaft to a universal joint, a coupling structure for coupling a drive shaft to a universal joint, and a coupling structure for coupling a propeller shaft to a universal joint.

SUMMARY OF THE INVENTION

One object of the invention is to provide a shaft-to-universal joint coupling structure configured to make it possible both to prevent a coupling pin inserted into a shaft and a universal joint from falling off, and to reduce the number of components and the number of man-hours required for assembly.

An aspect of the invention relates to a shaft-to-universal joint coupling structure including: a universal joint including two yokes pivotably coupled to each other, one of the two yokes having a through-hole that passes through the one of the two yokes; a sleeve formed in a hollow cylindrical shape, the sleeve being fitted to the one of the two yokes and having an insertion hole opposed to the through-hole; a coupling pin having a large-diameter portion having a portion press-fitted into the through-hole, a small-diameter portion formed at at least one of ends of the large-diameter portion, the small-diameter portion having an outer diameter smaller than an outer diameter of the large-diameter portion, and a step portion formed at a boundary between the large-diameter portion and the small-diameter portion; and a shaft that is fitted to a portion of the sleeve, the portion being on an opposite side of the sleeve from another portion of the sleeve, to which the one of the two yokes is fitted. The small-diameter portion is inserted into the insertion hole. The step portion is positioned inward of an inner peripheral face of the sleeve in a radial direction of the sleeve.

When the sleeve and the yoke rotate relative to each other the wall face of the insertion hole of the sleeve is brought into contact with the coupling pin. Thus, rotary torque of the sleeve is applied to the coupling pin. As a result, the coupling pin is elastically deformed. Then, a restoring fore due to elastic deformation of the coupling pin is applied to the wall face of the insertion hole of the sleeve. When a force pith which the wall face of the insertion hole pushes the coupling pin falls below the restoring force of the coupling pin, the coupling pin is slightly displaced in the axial direction of the coupling pin as the coupling pin is restored to its original shape. At this time, the wall face of the insertion hole is in contact with the coupling pin. If such a slight, displacement of the coupling pin with respect to the through-hole is repeated, the amount of the displacement of the coupling pin with respect to the through-hole is increased. This raises a possibility that the coupling pin will be removed from the yoke and fall off through the insertion hole of the sleeve.

The inventors who made the present invention focused on the fact that a force with which the wall face of the insertion hole pushes the coupling pin falls below a restoring force of the coupling pin, the coupling pin is slightly displaced in the axial direction of the coupling pin with respect to the through-hole with the wall face of the insertion hole kept in contact with the coupling pin. The inventors conceived of the idea that if a part of the coupling pin is brought into contact with the inner peripheral face 40A of the sleeve by using displacement of the coupling pin with respect to the through-hole, displacement of the coupling pin in the axial direction is restricted.

The inventors created the shaft-to-universal joint structure according to the invention, on the basis of the concept described above. Therefore, the shaft-to-universal joint structure according to the invention includes the coupling pin having the small-diameter portion inserted into the insertion hole and the step portion positioned inward of the inner peripheral face of the sleeve in the radial direction of the sleeve. With this coupling structure, when the coupling pin is slightly displaced with respect to the through-hole due to rotary torque of the sleeve, the step portion of the coupling pin approaches the inner peripheral face of the sleeve. As described above, when the coupling pin is slightly displaced with respect to the through-hole, the wall face of the insertion hole is in contact with the small-diameter portion. When the coupling pin is displaced by the amount that allows the coupling pin to be brought into contact with the inner peripheral face of the sleeve, the step portion is brought into contact with the inner peripheral face of the sleeve to restrict the displacement of the coupling pin with respect to the through-hole. Thus, the coupling pin is prevented from falling off. As described above, the coupling pin is prevented from falling off without changing the shape of the coupling pin. Thus, it is possible to prevent an increase in the number of components and reduce the number of man-hours required for assembly.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
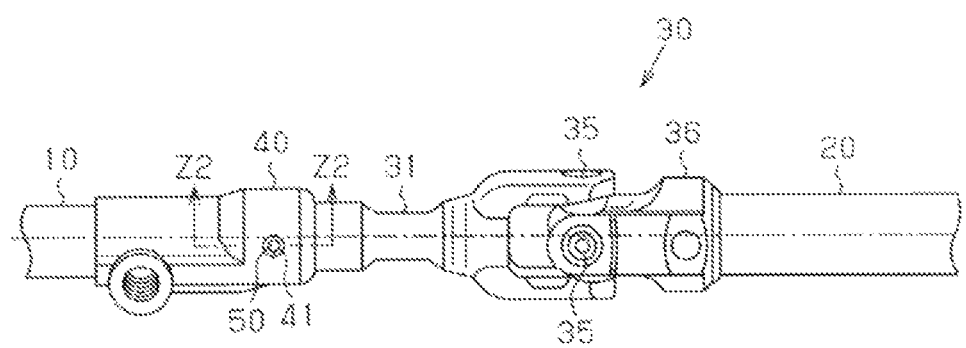
FIG. 1 is a from view of a shaft-to-universal joint coupling structure according to first embodiment of the invention, illustrating a coupling structure for coupling a column shaft to a universal joint.

Hereinafter, a shaft-to-universal joint coupling structure according to a first embodiment of the invention will be described with reference to FIG. 1. For example, the shaft-to-universal joint coupling structure is adopted as an element of a steering apparatus. The shaft-to-universal joint coupling structure may be embodied as a coupling structure for coupling a column shaft 10, which is an example of the shaft, to a universal joint 30 by which the column shaft 10 and an intermediate shaft 20 are pivotably coupled to each other. An example of the universal joint 30 is a so-called Cardan joint in which two yokes, that is, a shaft yoke 31 and a sleeve yoke 36 are pivotably coupled to each other via a cross joint (not illustrated) and four needle bearings 35 fitted to the cross joint.

The column shaft 10 and the universal joint 30 are coupled to each other via a hollow cylindrical sleeve 40. The column shaft 10 is fitted to one axial end portion of the sleeve 40 by serration fitting. The shaft yoke 31 of the universal joint 30 and the sleeve 40 are fixed to each other by welding, with the shaft yoke 31 being fitted into the other axial end portion of the sleeve 40. Thus, the sleeve 40 and the shaft yoke 31 are not allowed to rotate relative to each other. With the coupling structure for coupling the column shaft 10 to the universal joint 30, when the column shaft 10 is rotated in response to a steering operation, the sleeve 40 and the shaft yoke 31 rotate together with the column shaft 10. As the shaft yoke 31 rotates, the column shaft 10 and the intermediate shaft 20 rotate together with each other.

Figure 2:
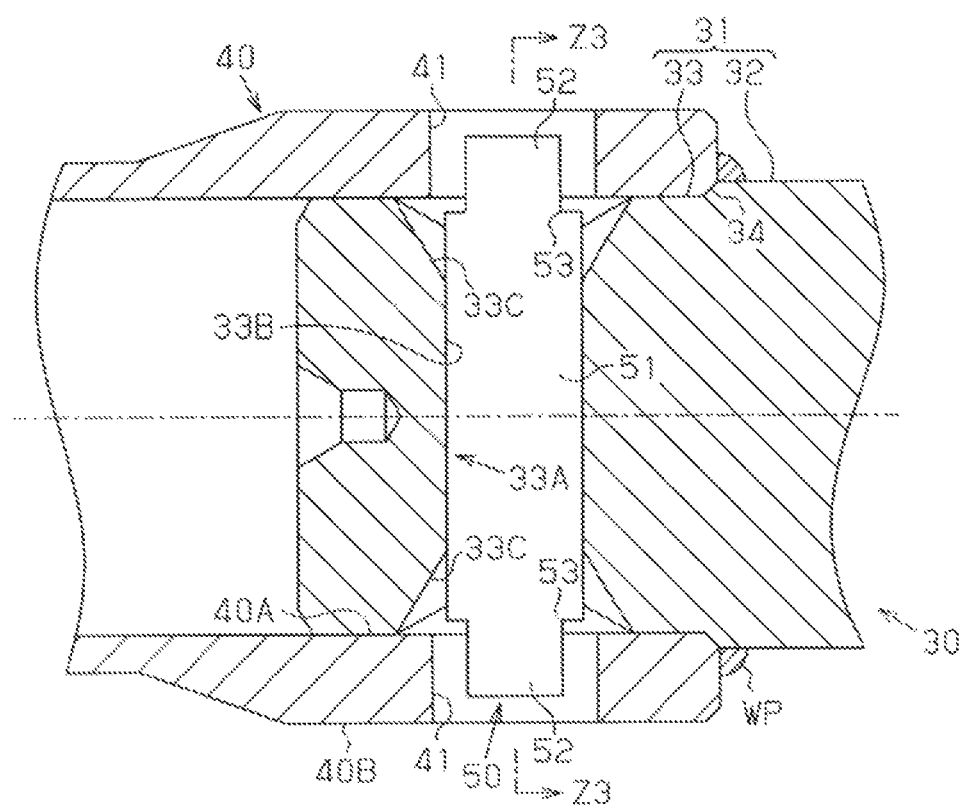
FIG. 2 is a sectional view taken along the line Z2-Z2 in FIG. 1.

As illustrated in FIG. 2, the shaft yoke 31 has a yoke body portion 32 and a fitting portion 33. The fitting portion 33 is formed so as to be contiguous with the sleeve 40-side end portion of the yoke body portion 32. The fitting portion 33 has an outer diameter smaller than the outer diameter of the end portion of the yoke body portion 32. Thus, a step portion 34 is formed at the boundary between the fitting portion 33 and the yoke body portion 32. The fitting portion 33 has a through-hole 33A that passes through the fitting portion 33 in a direction orthogonal to the axial direction of the shaft yoke 31. The through-hole 33A has a straight portion 33B and tapered portions 33C. The straight portion 33B is formed as a hole having a constant inner diameter. The tapered portions 33C are formed respectively at the opposite end portions of the straight portion 33B in its longitudinal direction. Each tapered portion 33C has a diameter that increases toward the outer peripheral face of the fitting portion 33.

The sleeve 40 is fitted onto the fitting portion 33, and is in contact with the step portion 34. A weld WP is formed at a position at which the sleeve 40 and the step portion 34 contact each other. The sleeve 40 has an insertion hole 41 formed at a portion opposed to the through-hole 33A.

The insertion hole 41 of the sleeve 40 and the through-hole 33A of the shaft yoke 31 are coaxial with each other. A coupling pin 50 is inserted into the insertion hole 41 and the through-hole 33A. The coupling pin 50 is fitted into the insertion hole 41 by clearance fit, whereas the coupling pin 50 is fitted into the straight portion 33B of the through-hole 33A by interference fit. There is a clearance between the coupling pin 50 and each of both the tapered portions 33C of the through-hole 33A.

The coupling pin 50 is formed into a columnar shape. The length of the coupling pin 50 in its axial direction is larger than the outer diameter of the fitting portion 33, and is smaller than the outer diameter of the sleeve 40. The coupling pin 50 has a large-diameter portion 51, small-diameter portions 52 formed at respective ends of the large-diameter portion 51, and step portions 53 formed at the boundaries between the large-diameter portion 51 and the small-diameter portions 52.

The large-diameter portion 51 is press-fitted in the straight portion 33B of the through-hole 33A. The length of the large-diameter portion 51 in the axial direction of the coupling pin 50 is smaller than the inner diameter of an inner peripheral face 40A of the sleeve 40. The small-diameter portions 52 project in the axial direction of the coupling pin 50 from the respective ends of the large-diameter portion 51. Each of the small-diameter portions 52 has an outer diameter smaller than the outer diameter of the large-diameter portion 51. The small-diameter portions 52 are inserted into the insertion holes 41. Each of the step portions 53 is positioned in a space defined by the inner peripheral face 40A of the sleeve 40 and a corresponding one of the tapered portions 33C of the through-hole 33A. Each of the step portions 53 is positioned radially inward of the inner peripheral face 40A of the sleeve 40 in the radial direction of the sleeve 40.

Figure 3A:
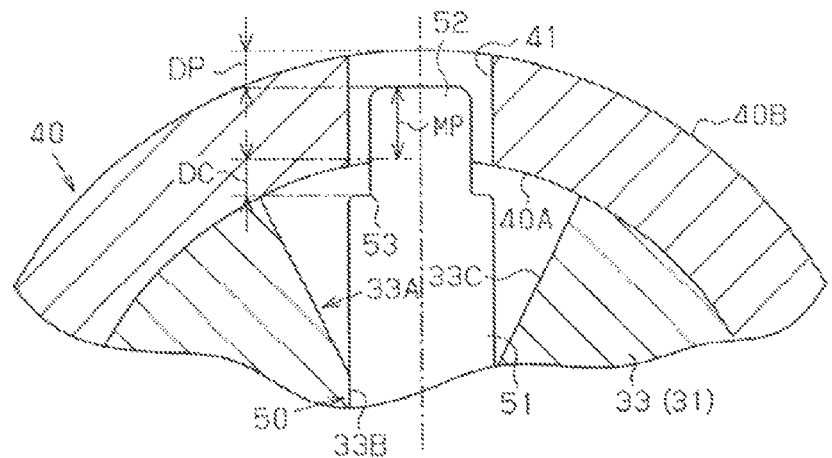
FIG. 3A is a sectional view taken along the line Z3-Z3 in FIG. 2.

As illustrated in FIG. 3A, in the axial direction of the coupling pin 50, a length MP of a portion of the small-diameter portion 52, which is housed in the insertion hole 41 of the sleeve 40, is larger than a value obtained by doubling a distance DC between the step portion 53 and the inner peripheral face 40A of the sleeve 40. In addition, in the axial direction of the coupling pin 50, a distance DP between the end face of the small-diameter portion 52 and an outer peripheral face 40B of the sleeve 40 is larger than the distance DC.

Figure 3B:
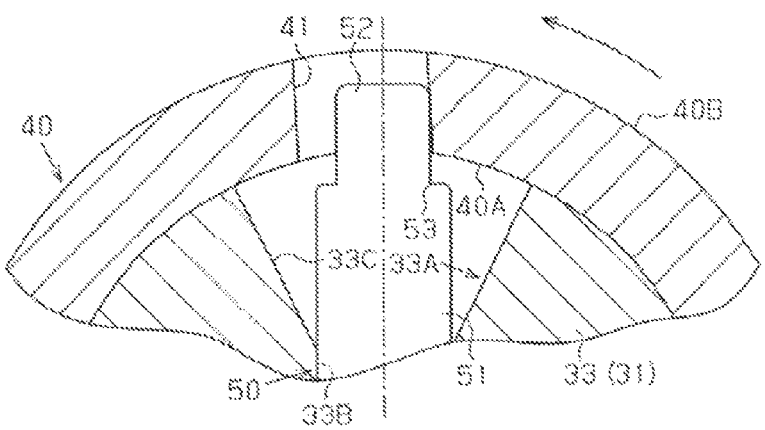
FIG. 3B is a sectional view taken along the line Z3-Z3 in FIG. 2, illustrating the state where a sleeve is rotated with respect to a shaft yoke.

Next, a mechanism for restricting relative displacement between the sleeve 40 and the shaft yoke 31, the mechanism being formed by the coupling pin 50, will be described below. In the case where the weld WP (refer to FIG. 2) is broken, when the column shaft 10 (refer to FIG. 1) is rotated in response to a steering operation, the sleeve 40 is rotated with respect to the shaft yoke 31 as illustrated in FIG. 3B. At this time, the wall face of the insertion hole 41 of the sleeve 40 is brought into contact with the small-diameter portion 52 of the coupling pin 50. As a result, relative displacement between the sleeve 40 and the shaft yoke 31 is restricted. In addition, rotary torque of the column shaft 10 is transmitted to the shaft yoke 31 through the sleeve 40 and the coupling pin 50. As a result, the column shaft 10 and the shaft yoke 31 rotate together with each other.

Figure 3C:
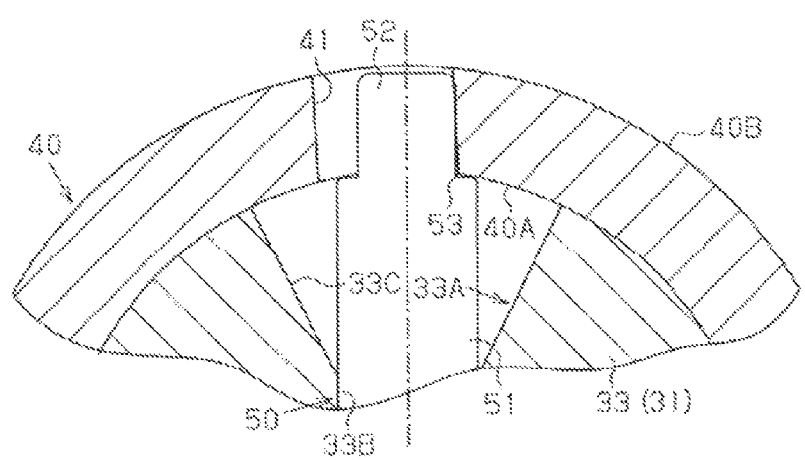
FIG. 3C is a sectional view taken along the line Z3-Z3 in FIG. 2, illustrating the state where a coupling pin is displaced.
Figure 4:
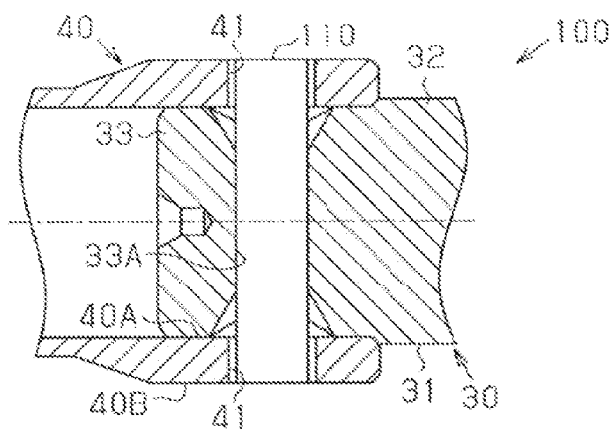
FIG. 4 is a sectional view of a shaft-to-universal joint coupling structure in a comparative example, illustrating coupled portions of a sleeve and a shaft yoke.

With reference to FIG. 3A to FIG. 3C and FIG. 4, a principle on which the coupling, pin falls off, and a principle on which the coupling pin is prevented from falling off will be described below. A comparative structure 100 illustrated in FIG. 4 is a structure in which a coupling pin 110 without the small-diameter portion 52 and the step portion 53 is used instead of the coupling pin 50 in the coupling structure for coupling the column shaft 10 (refer to FIG. 1) to the universal joint 30 in the present embodiment. In the description on the comparative structure 100, the same components as those in the coupling structure for coupling the column shaft 10 to the universal joint 30 in the present embodiment will be denoted by the same reference symbols as those in the coupling structure in the present embodiment, for the sake of convenience.

In the comparative structure 100 as well as in the coupling structure for coupling the column shaft 10 to the universal joint 30 in the present embodiment, in the state where the weld WP (refer to FIG. 2) is broken, when the sleeve 40 attempts to rotate with respect to the shaft yoke 31, the wall face of the insertion hole 41 of the sleeve 40 is brought into contact with the coupling pin 110 to restrict relative displacement between the sleeve 40 and the shaft yoke 31.

When the wall face of the insertion hole 41 of the sleeve 40 is brought into contact with the coupling pin 110, rotary torque of the column shaft 10 is applied to the coupling pin 110. As a result, the coupling pin 110 is elastically deformed. When a force with which the wall face of the insertion hole 41 pushes the coupling pin 110 falls below a restoring force of the coupling pin 110, the coupling pin 110 is slightly displaced in the axial direction of the coupling pin 110 with respect to the through-hole 33A of the fitting portion 33. At this time, the wall face of the insertion hole 41 is in contact with the coupling pin 110.

If such a slight displacement of the coupling pin 110 with respect to the through-hole 33A is repeated, the amount of the displacement of the coupling pin 110 with respect to the through-hole 33A is increased. This raises a possibility that the coupling pin 110 will come out of the through-hole 33A and fall of through the insertion hole 41 of the sleeve 40.

The inventors who made the present invention focused on the fact that a force with which the wall face of the insertion hole 41 pushes the coupling pin 110 falls below a restoring force of the coupling pin 110, the coupling pin 110 is slightly displaced with respect to the through-hole 33A with the wall face of the insertion hole 41 kept in contact with the coupling pin 110. The inventors conceived of the idea that if a part of the coupling pin is brought into contact with the inner peripheral face of the sleeve by using displacement of the coupling pin in the axial direction of the coupling pin with respect to the through-hole of the yoke, displacement of the coupling pin is restricted.

As illustrated in FIG. 3A, the coupling structure for coupling the column shaft 10 and the universal joint 30 in the present embodiment includes the coupling pin 50 having the small-diameter portion 52 and the step portion 53. The small-diameter portion 52 is inserted into the insertion hole 41 of the sleeve 40. The step portion 53 is positioned radially inward of the inner peripheral face 40A of the sleeve 40. With this structure, when the coupling pin 50 is slightly displaced with respect to the through-hole 33A due to rotary torque of the sleeve 40, the step portion 53 of the coupling pin 50 approaches the inner peripheral face 40A of the sleeve 40. As described above, when the coupling pin 50 is slightly displaced with respect to the through-hole 33A, the wall face of the insertion hole 41 is in contact with the small-diameter portion 52. When the coupling pin 50 is displaced by the amount that allows the coupling pin 50 to be brought into contact with the inner peripheral face 40A of the sleeve 40, as illustrated in FIG. 3C, the step portion 53 is brought into contact with the inner peripheral face 40A of the sleeve 40 to restrict the displacement of the coupling pin 50 with respect to the through-hole 33A. Thus, the coupling pin 50 is prevented from falling off.

Figure 5:
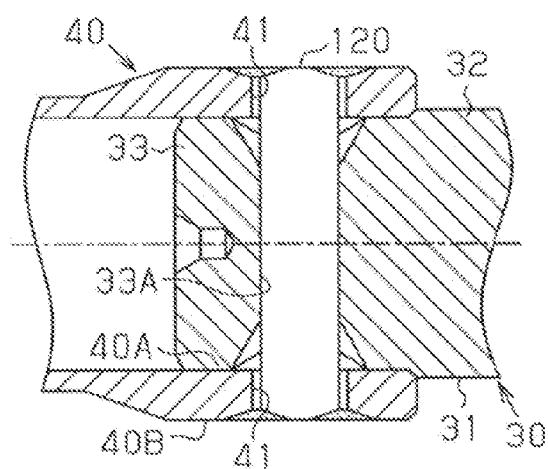
FIG. 5 is a sectional view of a shaft-to-universal joint structure in a comparative example, illustrating coupled portions of a sleeve and a shaft yoke.
Figure 6:
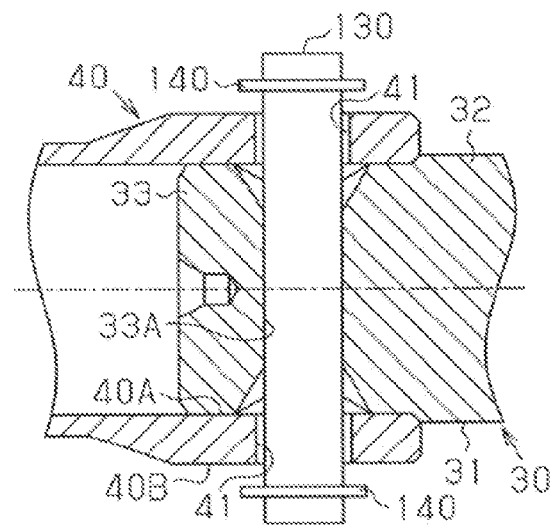
FIG. 6 is a sectional view of a shaft-to-universal joint coupling structure in a comparative example, illustrating coupled portions of a sleeve and a shaft yoke.

The shaft-to-universal joint coupling structure according to the present embodiment produces the following advantageous effects. Structures illustrated in FIG. 5 and FIG. 6 may be adopted in order to prevent a coupling pin from falling off. FIG. 5 illustrates the configuration in which a coupling pin 120 and the rim of the insertion hole 41 of the sleeve 40 are crimped (hereinafter, referred to as "pin crimping configuration"). A crimped portion formed by crimping the coupling pin 120 and the rim of the insertion hole 41 is indicated by with dots in FIG. 5. FIG. 6 illustrates the configuration in which the opposite end portions of a coupling pin 130 are projected outward from the sleeve 40, and each of both projected portions of the coupling pin 130 is provided with a snap ring 140 (hereinafter referred to as "snap ring configuration").

In the pin crimping configuration, the crimping strength varies among individual universal joint products. Therefore, if a crimping strength is low, crimping, between the coupling pin 120 and the rim of the insertion hole 41 may be removed to cause the coupling pin 120 to fall off. Further, addition of a crimping process increases the number of man-hours required to assemble a universal joint.

In the snap ring configuration, because the snap rings 140 are fitted to the opposite end portions of the coupling pin 130, the size of each of the portions that are projected outward from the sleeve 40 is increased. This raises a possibility that the projected portions will interfere with components (not illustrated) disposed near the position at which the sleeve 40 and the universal joint 30 are fitted together. In addition, provision of the snap rings 140 increases the number of components. Accordingly, addition of a process of fitting the snap rings 140 increases the number of man-hours required to assemble a universal joint.

In contrast to this, in the coupling structure for coupling the column shaft 10 to the universal joint 30 in the present embodiment, the coupling pin 50 has the small-diameter portion 52 and the step portion 53. That is, it is not necessary to provide any component used only to prevent the coupling pin 50 from falling off. Thus, the number of components and the number of man-hours required for assembly are smaller than those in the snap ring configuration. In addition, the coupling structure for coupling the column shaft 10 to the universal joint 30 in the present embodiment does not require an additional assembly process such as a crimping process for preventing the coupling pin 50 from falling off. Thus, the number of man-hours required for assembly is smaller than that in the pin crimping configuration.

When the sleeve 40 and the shaft yoke 31 are not allowed to rotate relative to each other, the length MP of the portion of the small-diameter portion 52, which is housed in the insertion hole 41 of the sleeve 40, is larger than a value obtained by doubling the distance DC between the step portion 53 and the inner peripheral face 40A of the sleeve 40. In addition, each of both ends of the coupling pin 50 has the small-diameter portion 52. With this configuration, when the sleeve 40 and the shaft yoke 31 rotate relative to each other and thus the step portion 53 is brought into contact with the inner peripheral face 40A of the sleeve 40, the small-diameter portion 52 located on the opposite side of the coupling pin 50 from the portion of the coupling pin 50, which is in contact with the inner peripheral face 40A of the sleeve 40, is positioned in the insertion hole 41 of the sleeve 40. Thus, the wall face of each of the insertion holes 41 is allowed to be brought into contact with the small-diameter portion 52. Thus, a load applied to each small-diameter portion 52 is lower than that in the configuration in which the wall face of only one of the insertion holes 41 is brought into contact with the small-diameter portion 52.

When the sleeve 40 and the shaft yoke 31 are not allowed to rotate relative to each other, the small-diameter portions 52 are positioned radially inward of the outer peripheral face 40B of the sleeve 40. With this configuration, when the sleeve 40 and the shaft yoke 31 rotate relative to each other and thus the step portion 53 is brought into contact with the inner peripheral face 40A of the sleeve 40, the small-diameter portions 52 of the coupling pin 50 are not projected outward from the outer peripheral face 40B of the sleeve 40. Thus, the coupling pin 50 does not interfere with the components (not illustrated) disposed near the coupling structure for coupling the column shaft 10 to the universal joint 30.

When the sleeve 40 and the shaft yoke 31 are not allowed to rotate relative to each other, the distance DP between the end face of the small-diameter portion 52 and the outer peripheral face 40B of the sleeve 40 is larger than the distance DC between the step portion 53 and the inner peripheral face 40A of the sleeve 40. With this configuration, even when the sleeve 40 and the shaft yoke 31 rotate relative to each other and thus the step portion 53 is brought into contact with the inner peripheral face 40A of the sleeve 40, the small-diameter portions 52 are not projected outward from the outer peripheral face 40B of the sleeve 40. As a result, the coupling pin 50 does not interfere with the components disposed near the position at which the shaft yoke 31 and the sleeve 40 are fitted together.

If the coupling pin 50 and the insertion hole 41 of the sleeve 40 are fitted together by interference fit, the sleeve 40 and the shaft yoke 31 are coupled to each other by the coupling pin 50 even when the sleeve 40 and the shaft yoke 31 are poorly welded to each other. Thus, it is difficult to check whether the sleeve 40 and the shaft yoke 31 are poorly welded to each other.

In contrast to this, in the present embodiment, the coupling pin 50 and the insertion hole 41 of the sleeve 40 are fitted together by clearance fit. With this configuration, if the sleeve 40 and the shaft yoke 31 are poorly welded to each other, the sleeve 40 and the shaft yoke 31 are allowed to be displaced relative to each other by an amount corresponding to a clearance between the wall face of the insertion hole 41 and the small-diameter portion 52 of the coupling pin 50. Thus, a worker is able to find out that the sleeve 40 and the shaft yoke 31 are poorly welded, when the sleeve 40 and the shaft yoke 31 are displaced relative to each other. Thus, it is possible to easily check whether the sleeve 40 and the shaft yoke 31 are poorly welded to each other.

Figure 7:
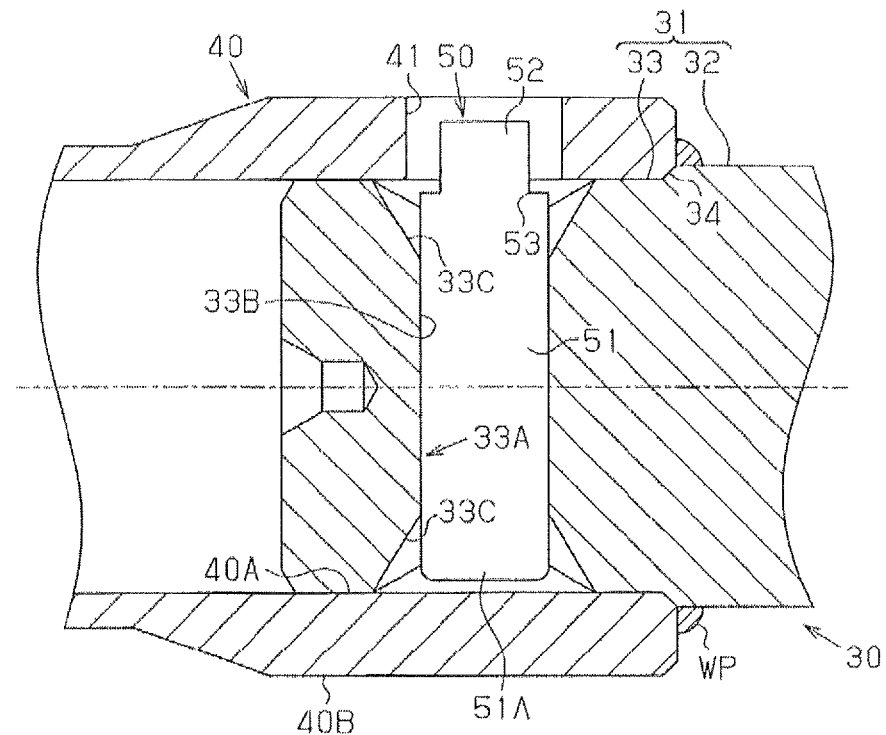
FIG. 7 is a sectional view illustrating coupled portions of a sleeve and a shaft yoke according to a second embodiment of the invention.

FIG. 7 illustrates a shaft-to-universal joint coupling structure according to a second embodiment of the invention. The shaft-to-universal joint coupling structure in the present embodiment is different from the shaft-to-universal joint coupling structure according to the first embodiment illustrated in FIG. 1, in the configurations of the sleeve 40 and the coupling pin 50. The configurations of the shaft-to-universal joint coupling structure according to the second embodiment, which are different from those of the shaft-to-universal joint coupling structure according to the first embodiment, will be described below, and the configurations of the shaft-to-universal joint coupling structure according to the second embodiment, which are the same as those in the shaft-to-universal joint structure according to the first embodiment, will be denoted by the same reference symbols as those in the first embodiment, and description thereon will be partially or entirely omitted.

The sleeve 40 has only one insertion hole 41 instead of having two insertion holes 41. The coupling pin 50 has the small-diameter portion 52 formed at one end of the large-diameter portion 51, which corresponds to the insertion hole 41. No small-diameter portion 52 is formed at the other end of the large-diameter portion 51, which is on the opposite side of the large-diameter portion 52 from the small-diameter portion 52 (hereinafter, the other end of the large-diameter portion 51 will be referred to as "end portion 51A of the large-diameter portion 51"). The end portion 51A of the large-diameter portion 51 faces the inner peripheral face 40A of the sleeve 40 in the axial direction of the coupling pin 50 via a clearance.

Next, a principle on which the coupling pin 50 is prevented from falling off will be described. In the case where the weld WP is broken, when the column shaft 10 (refer to FIG. 1) is rotated in response to a steering operation to allow the sleeve 40 to rotate relative to the shaft yoke 31, the wall face of the insertion hole 41 of the sleeve 40 is brought into contact with the small-diameter portion 52 of the coupling pin 50 before the end portion 51A of the large-diameter portion 51 is brought into contact with the inner peripheral face 40A of the sleeve 40.

Figure 8:
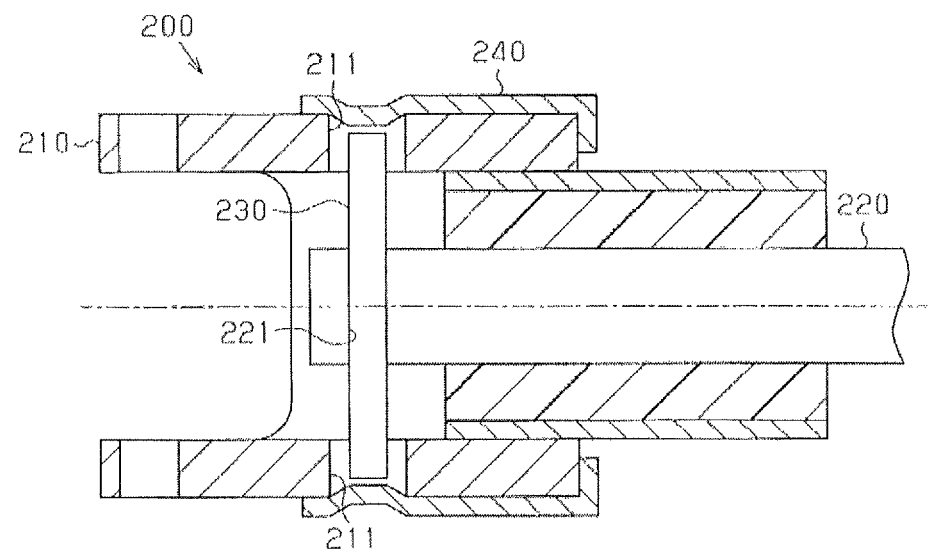
FIG. 8 is a sectional view illustrating a conventional shaft-to-universal joint coupling structure.

When rotary torque of the sleeve 40 is repeatedly applied to the coupling pin 50 to cause the coupling pin 50 to be displaced with respect to the through-hole 33A of the fitting portion 33 of the shaft yoke 31 so that the end portion 51A of the large-diameter portion 51 is displaced toward the inner peripheral face 40A of the sleeve 40, the end portion 51A of the large-diameter portion 51 is brought into contact with the inner peripheral face 40A of the sleeve 40. As a result, in the axial direction of the coupling pin 50, displacement of the coupling pin 50 with respect to the through-hole 33A is restricted. In this way, the coupling pin 50 is prevented from falling off. Because it is no longer necessary to provide the cap 240 of the conventional shall-to-universal joint coupling structure illustrated in FIG. 8, the number of components and the number of man-hours required for assembly are made smaller than those in the conventional shaft-to-universal joint coupling structure.

When the sleeve 40 rotates with respect to the shaft yoke 31 with the end portion 51A of the large-diameter portion 51 kept in contact with the inner peripheral face 40A of the sleeve 40, the end portion 51A of the large-diameter portion 51 slides with respect to the inner peripheral face 40A of the sleeve 40 to bring the small-diameter portion 52 of the coupling pin 50 into contact with the wall face of the insertion hole 41 of the sleeve 40. As a result, relative rotation between the sleeve 40 and the shaft yoke 31 is restricted.

A principle on which the coupling pin 50 is prevented from falling off by using the insertion hole 41 and the small-diameter portion 52 and the step portion 53 of the coupling pin 50 is the same as that in the first embodiment. The shaft-to-universal joint coupling structure in the present embodiment produces advantageous effects similar to those produced by the shaft-to-universal joint coupling structure in the first embodiment.

The shaft-to-universal joint coupling structure according to the invention is not limited to the structures according to the embodiments described above. For example, the following modifications may be made to the above described embodiments.

In each of the embodiments described above, the small-diameter portion 52 of the coupling pin 50 and the rim of the insertion hole 41 may be crimped. In each of the embodiments described above, a Rzeppa joint may be used as the universal joint 30, instead of the Cordon joint.

In each of the embodiments described above, the distance DP between the end face of the small-diameter portion 52 and the outer peripheral face 40B of the sleeve 40 may be equal to the distance DC between the step portion 53 and the inner peripheral face 40A of the sleeve 40.

In each of the embodiments described above, the coupling pin 50 may project outward from the outer peripheral face 40B of the sleeve 40, within a range in which the coupling pin 50 does not interfere with the components disposed near the position at which the shaft yoke 31 and the sleeve 40 are fitted together.

In each of the embodiments described above, the shaft yoke 31 may be used in the universal joint 30, instead of the sleeve yoke 36. The shaft-to-universal joint coupling structure according to each of the embodiments described above is applied to the coupling structure for coupling the column shaft 10 to the universal joint 30. Alternatively, the shaft-to-universal joint coupling structure according to each of the embodiments described above may be applied to a coupling structure for coupling the intermediate shaft 20 to the universal joint 30. Further alternatively, the shaft-to-universal joint coupling structure according to each of the embodiments described above may be applied to a coupling structure for coupling a pinion shaft to a universal joint.

The shaft-to-universal joint coupling structure according to each of the embodiments described above is applied to a steering shaft of a steering apparatus. Alternatively, the shaft-to-universal joint coupling structure according to each of the embodiments described above may be applied to components other than a steering apparatus, such as a propeller shaft, and a drive shaft.

What is claimed is:

1. A shaft-to-universal joint coupling structure comprising:
    a universal joint including two yokes pivotably coupled to each other, one of the two yokes having a through-hole that passes through the one of the two yokes;
    a sleeve formed in a hollow cylindrical shape, the sleeve being fitted to the one of the two yokes and having an insertion hole opposed to the through-hole;
    a coupling pin having a large-diameter portion having a portion press-fitted into the through-hole, a small-diameter portion formed at at least one of the ends of the large-diameter portion, the small-diameter portion having an outer diameter smaller than an outer diameter of the large-diameter portion, and a step portion formed at a boundary between the large-diameter portion and the small-diameter portion; and
    a shaft that is fitted to a portion of the sleeve, the portion being on an opposite side of the sleeve from another portion of the sleeve, to which the one of the two yokes is fitted, wherein
    the small-diameter portion is inserted into the insertion hole, and
    the step portion is positioned inward of an inner peripheral face of the sleeve in a radial direction of the sleeve.

2. The shaft-to-universal joint coupling structure according to claim 1, wherein:
    the sleeve and the yoke are fixed to each other so as to be non-rotatable relative to each other; and
    when the sleeve and the yoke are non-rotatable relative to each other, an end of the small-diameter portion is positioned radially inward of an outer peripheral face of the sleeve.

3. The shaft-to-universal joint coupling structure according to claim 2, wherein when the sleeve and the yoke are non-rotatable relative to each other, a distance between an end face of the small-diameter portion and the outer peripheral face of the sleeve is equal to or larger than a distance between the step portion and the inner peripheral face of the sleeve.

4. The shaft-to-universal joint coupling structure according to claim 1, wherein:
    the small-diameter portion is formed at each of both ends of the large-diameter portion;
    the sleeve and the yoke are fixed to each other so as to be non-rotatable relative to each other; and
    when the sleeve and the yoke are non-rotatable relative to each other, a length of a portion of the small-diameter portion, the portion being housed in the insertion hole, is larger than a value obtained by doubling a distance between the step portion and the inner peripheral face of the sleeve.

5. The shaft-to-universal joint coupling structure according to claim 1, wherein the universal joint connects a column shaft serving as the shaft to an intermediate shaft coupled to the other one of the two yokes.

* * * * *